(12) United States Patent
Benz et al.

(10) Patent No.: US 9,650,956 B2
(45) Date of Patent: May 16, 2017

(54) INTAKE ARRANGEMENT IN GAS TURBINE POWER PLANT

(71) Applicant: ALSTOM Technology Ltd, Baden (CH)

(72) Inventors: Eribert Benz, Birmenstorf (CH); Robin Payne, Wettingen (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 347 days.

(21) Appl. No.: 14/446,652

(22) Filed: Jul. 30, 2014

(65) Prior Publication Data

US 2015/0047314 A1   Feb. 19, 2015

(30) Foreign Application Priority Data

Aug. 14, 2013   (EP) .................................... 13180433

(51) Int. Cl.
*F02C 7/04*   (2006.01)
*F01K 23/10*   (2006.01)
(Continued)

(52) U.S. Cl.
CPC ................. *F02C 7/04* (2013.01); *B01F 3/02* (2013.01); *B01F 5/0082* (2013.01); *F01K 23/10* (2013.01);
(Continued)

(58) Field of Classification Search
CPC .... F02C 7/04; F02C 1/005; F02C 7/08; F02C 3/34; B01F 5/0082; B01F 3/02; F01K 23/10
(Continued)

(56) References Cited

U.S. PATENT DOCUMENTS 3,460,916 A * 8/1969 Aronsohn ................. F01N 3/10
422/171
2001/0000049 A1 * 3/2001 Kataoka ................. F02C 3/305
60/775
(Continued)

FOREIGN PATENT DOCUMENTS

CH            701 235 A1   12/2010
CN         104204465 A     12/2014
(Continued)

OTHER PUBLICATIONS

Chinese Office Action issued Feb. 3, 2017 in corresponding Chinese Patent Application No. 201410398648.9 with English translation.

*Primary Examiner* — Steven A. Reynolds
(74) *Attorney, Agent, or Firm* — Buchanan Ingersoll & Rooney PC

(57) ABSTRACT

An intake arrangement for a compressor in a gas turbine power plant includes at least a passageway having an elongated portion, and a circular portion at an end of the elongated portion. The circular portion may be arranged in proximity to the compressor at around a compressor inlet. The passageway may be divided at least circumferentially and radially across the entire elongated portion and at least partially across the circular portion to configure a plurality of flue gas and air inlet segments for respectively conveying flue gas and air streams therethrough. The flue and air gas streams from each of the respective plurality of flue gas and air inlet segments, converge to be blended into a target mass stream for being conveyed into the compressor.

10 Claims, 4 Drawing Sheets

(51) Int. Cl.
　　　*F02C 1/00*　　　　(2006.01)
　　　*F02C 3/34*　　　　(2006.01)
　　　*F02C 7/08*　　　　(2006.01)
　　　*B01F 5/00*　　　　(2006.01)
　　　*B01F 3/02*　　　　(2006.01)

(52) U.S. Cl.
　　　CPC ............... *F02C 1/005* (2013.01); *F02C 3/34* (2013.01); *F02C 7/08* (2013.01); *F05D 2240/127* (2013.01); *F05D 2240/128* (2013.01)

(58) Field of Classification Search
　　　USPC .............................................. 60/39.52, 39.5
　　　See application file for complete search history.

(56) References Cited

U.S. PATENT DOCUMENTS

| | | | | |
|---|---|---|---|---|
| 2010/0115960 | A1* | 5/2010 | Brautsch | F02C 3/30 60/772 |
| 2012/0240590 | A1* | 9/2012 | Hellat | F01D 25/08 60/772 |
| 2013/0047576 | A1* | 2/2013 | Sander | F02C 3/34 60/39.182 |
| 2013/0086883 | A1* | 4/2013 | Sander | F02C 3/34 60/39.52 |
| 2013/0305732 | A1* | 11/2013 | Benz | B01F 3/02 60/772 |
| 2015/0050140 | A1* | 2/2015 | Payne | F02C 1/005 415/222 |

FOREIGN PATENT DOCUMENTS

| | | |
|---|---|---|
| EP | 2 642 098 A1 | 9/2013 |
| WO | 2012/101087 A1 | 8/2012 |

\* cited by examiner 140       130

INTAKE ARRANGEMENT IN GAS TURBINE POWER PLANT

CROSS-REFERENCE TO RELATED APPLICATIONS

This application claims priority to European application 13180433.8 filed Aug. 14, 2013, the contents of which are hereby incorporated in its entirety.

TECHNICAL FIELD

The present disclosure relates to gas turbine power plants, and, more particularly, to intake arrangements in gas turbine power plants with flue gas recirculation.

BACKGROUND

In re-circulation of the exhaust gases, a substantial fraction of the exhaust gases is separated from the overall exhaust gases and is normally delivered again, after cooling and purification, to a compressor. The exhaust gas composition differs considerably from the composition of fresh ambient air. The recirculated exhaust gas stream, in conventional flue gas recirculation, of the gas turbine configuration, is mixed with the fresh ambient air from the surroundings and this mixture is subsequently delivered to the compressor.

Proper mixing of the flue gas with the fresh ambient air may be required for effectively working of the gas turbine engines. In order to enable proper mixing, conventionally, mixer with blowers can be used. However, due to blowers being costly and requirement of additional space in a power plant, and use thereof in further detrimental to the power and efficiency of the power plant; there is need of such a system, which may be capable of enhancing mixing of the flue gas and the fresh ambient air in economical and effective manner without requirement of the such blowers or mixers.

SUMMARY

The present disclosure describes an improved intake arrangement with enhanced mixing of the recirculated flue gas and fresh ambient air in gas turbine power plants, that will be presented in the following simplified summary to provide a basic understanding of one or more aspects of the disclosure that are intended to overcome the discussed drawbacks, but to include all advantages thereof, along with providing some additional advantages. This summary is not an extensive overview of the disclosure. It is intended to neither identify key or critical elements of the disclosure, nor to delineate the scope of the present disclosure. Rather, the sole purpose of this summary is to present some concepts of the disclosure, its aspects and advantages in a simplified form as a prelude to the more detailed description that is presented hereinafter.

An object of the present disclosure is to describe an intake arrangement to enhance mixing of the recirculated flue gas and fresh ambient air in gas turbine power plants. Another object of the present disclosure is to describe an intake arrangement, which is effective in mixing the recirculated flue gas and the fresh ambient air in the gas turbine power plants in an adaptable and economical manner. Various other objects and features of the present disclosure will be apparent from the following detailed description and claims.

The above noted and other objects, in one aspect, may be achieved by an intake arrangement for a compressor in a gas turbine power plant. The intake arrangement includes at least a passageway having an elongated portion, and a circular portion at an end of the elongated portion. The circular portion may be arranged in proximity to the compressor at around a compressor inlet. The passageway may be divided at least circumferentially and radially across the entire elongated portion and at least partially across the circular portion to configure a plurality of flue gas inlet segments and a plurality of air inlet segments. Each of the plurality of flue gas inlet segments is adapted to convey a flue gas stream therethrough. Further, each of the plurality of air inlet segments is adapted to convey a fresh air stream therethrough. The flue gas stream and the fresh air stream from each of the respective plurality of flue gas and air inlet segments converges at a region 'P' around and after the circular portion, to be blended into a target mass stream for being conveyed into the compressor through the compressor inlet.

In one embodiment of the present disclosure, the segments may be adapted to be partially configured across the circular portion such that the segments in the circular portion extend up to a portion, leaving a specific portion.

In one embodiment of the present disclosure, a converging nozzle may be adapted to be disposed in coordination with the circular portion, more or less in the portion. The converging nozzle may be disposed facing its converging face towards the compressor inlet.

In one embodiment the area ratio from nozzle inlet to nozzle exit for the converging nozzle feeding the flue gas to the compressor inlet is different from the area ratio from nozzle inlet to nozzle exit for the converging nozzle feeding the fresh air stream to the compressor inlet. Thus the pressure ratio over the nozzle feeding the flue gas is different for the pressure ratio over the nozzle feeding the fresh air stream. For a common pressure at the nozzle exit, i.e. at the compressor inlet, and a given ambient pressure for the fresh air the pressure at the inlet of the nozzle for flue gas, i.e. in the flue gas recirculation line, can be adjusted by selection of different area ratios and lowered to a level which is sufficient to overcome the pressure loss of the flue gas recirculation line including flue gas treatment and flue gas cooler. Alternatively, or in combination the area ratio can be used to adapt the flow velocities at the nozzle exits.

In one embodiment of the present disclosure, the region 'P' is an area extending from the portion of the circular portion to up to the compressor inlet.

In one embodiment of the present disclosure, the passageway may be divided to configure alternating adjacent segments of one air inlet segment and one flue gas inlet segment to each other.

In one embodiment of the present disclosure, the circular portion of the passageway is divided into at least two concentric annular openings facing the compressor inlet. Each of the annular openings is further dived in circumferential direction into at least two segments. The resulting adjacent segments are configured to be alternating adjacent segments of one air inlet segment and one flue gas inlet segment to each other in circumferential direction and to be alternating adjacent segments of one air inlet segment and one flue gas inlet segment to each other in radial direction, i.e. from an inner to an outer annular opening.

In one embodiment of the present disclosure, each of the plurality of air inlet segment at an end of the elongated portion may be adapted to be connected to a pipe to receive the fresh air. Similarly, each of the plurality of flue gas inlet segment at an end of the elongated portion may be adapted to be connected to a pipe to receive the flue gas.

In one embodiment of the present disclosure, the intake arrangement may include at least one turbulator configured proximate to the circular portion to enhance the turbulence there across.

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The advantages and features of the present disclosure will be better understood with reference to the following detailed description and claims taken in conjunction with the accompanying drawing, wherein like elements are identified with like symbols, and in which:

Like reference numerals refer to like parts throughout the description of several views of the drawings.

DETAILED DESCRIPTION

For a thorough understanding of the present disclosure, reference is to be made to the following detailed description, including the appended claims, in connection with the above described drawings. In the following description, for purposes of explanation, numerous specific details are set forth in order to provide a thorough understanding of the present disclosure. It will be apparent, however, to one skilled in the art that the present disclosure can be practiced without these specific details. In other instances, structures and apparatuses are shown in block diagrams form only, in order to avoid obscuring the disclosure.

Reference in this specification to "one embodiment," "an embodiment," "another embodiment," "various embodiments," means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be of other embodiment's requirement.

Although the following description contains many specifics for the purposes of illustration, anyone skilled in the art will appreciate that many variations and/or alterations to these details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure. Further, the relative terms herein do not denote any order, elevation or importance, but rather are used to distinguish one element from another. Further, the terms "a" and "an" herein do not denote a limitation of quantity, but rather denote the presence of at least one of the referenced item.

Figure 1:
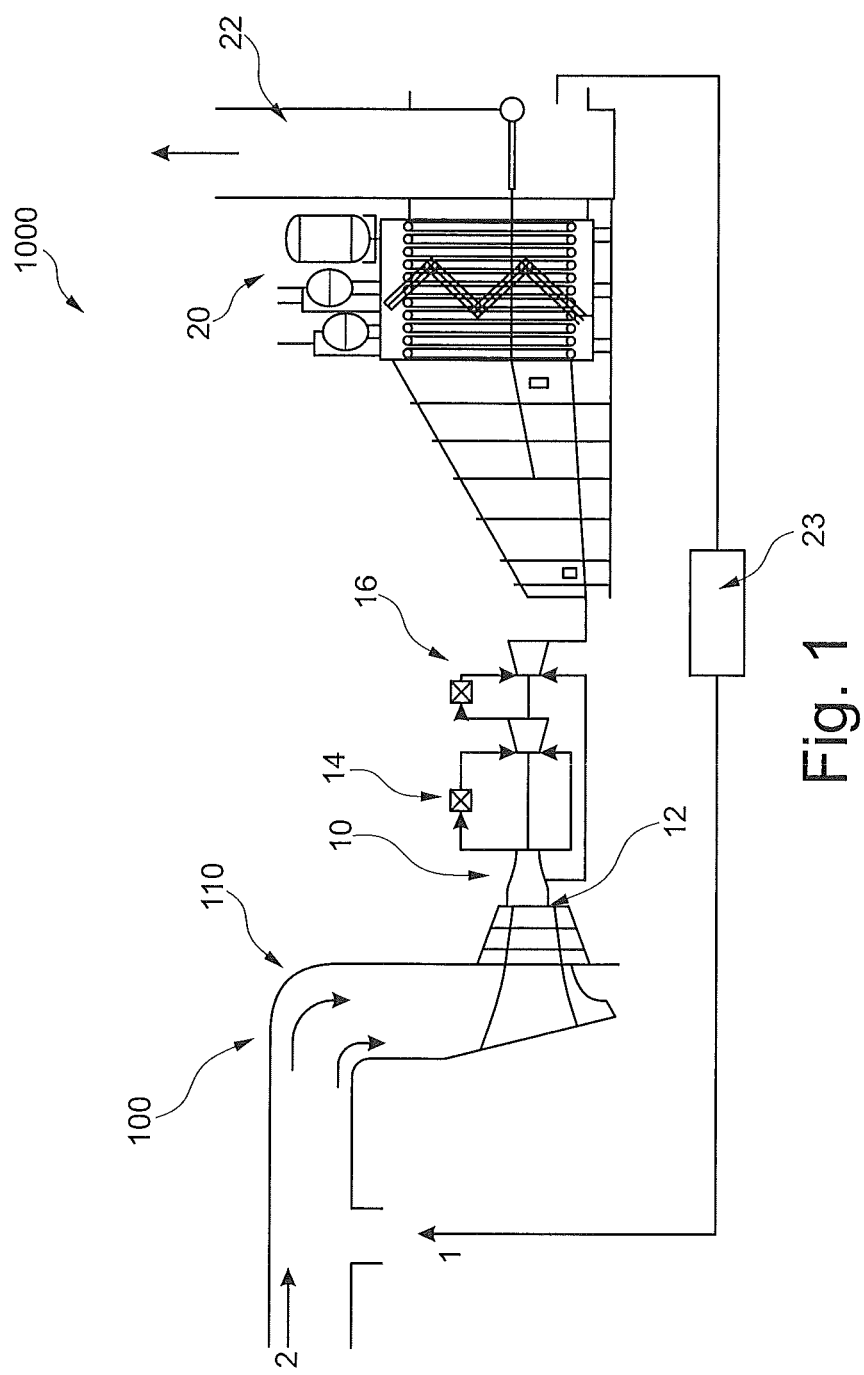
FIG. 1 illustrates an example of a gas turbine power plant depicting an intake arrangement, in accordance with an exemplary embodiment of the present disclosure.
Figure 2:
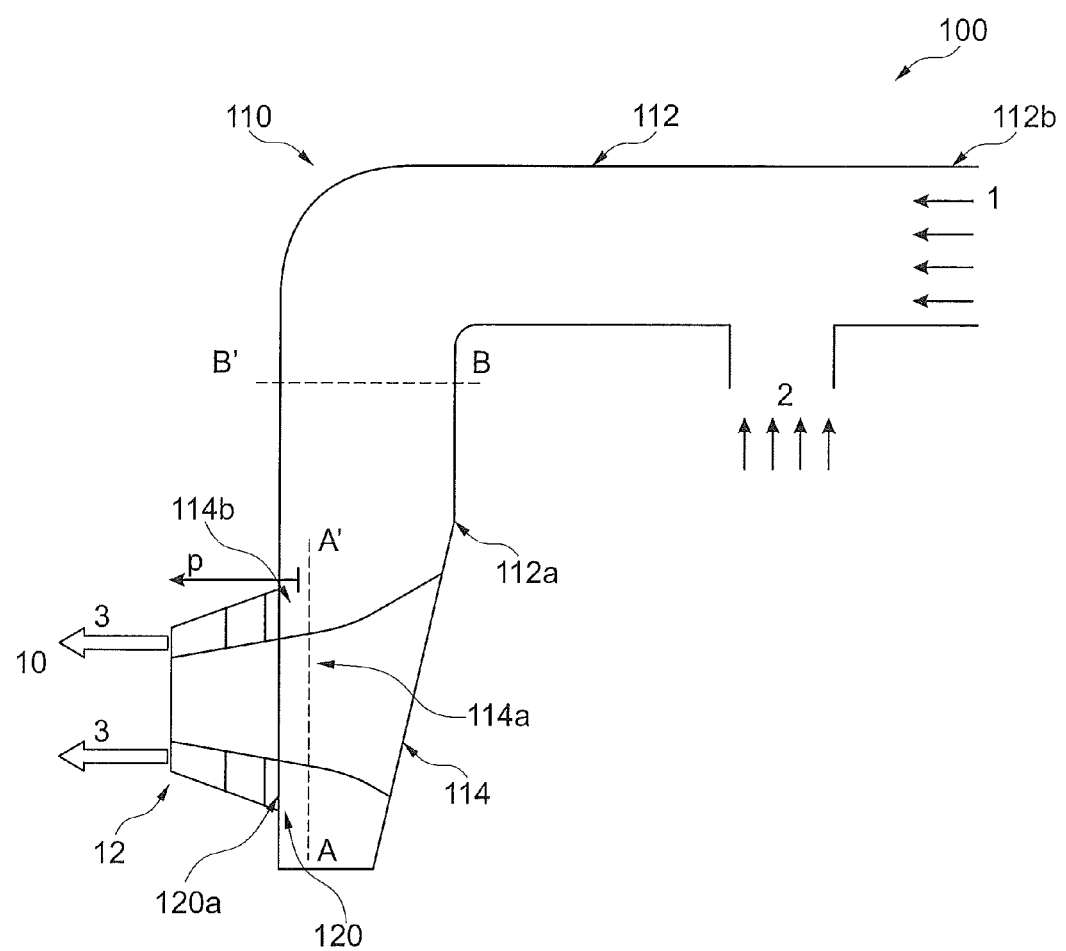
FIG. 2 illustrates side view of the intake arrangement of FIG. 1, in accordance with an exemplary embodiment of the present disclosure.
Figure 3A:
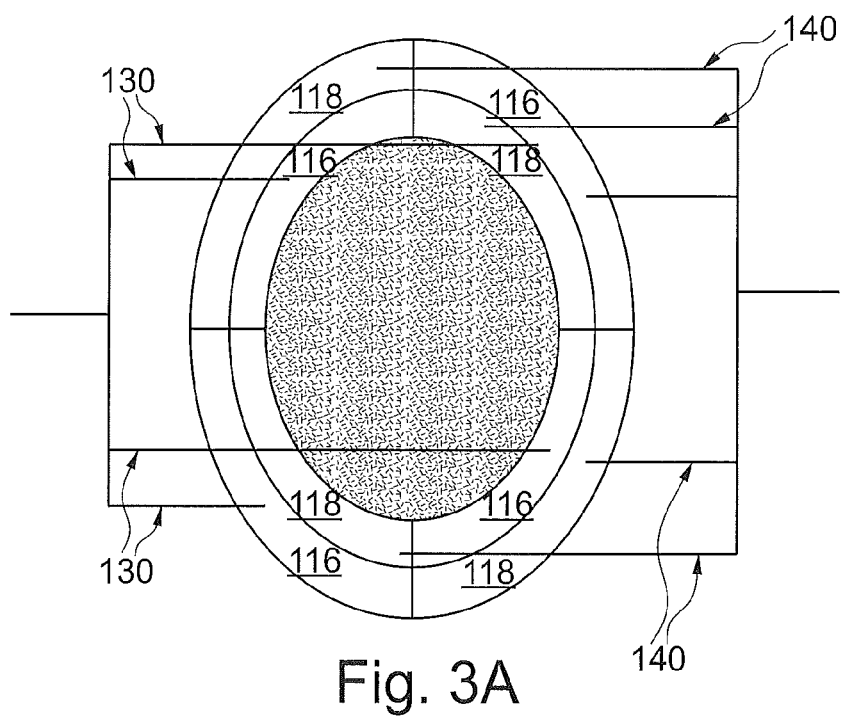
FIGS. 3A to 3C illustrate example cross-sectional views across A-A' of the intake arrangement of FIG. 2, in accordance with an exemplary embodiment of the present disclosure.
Figure 3B:
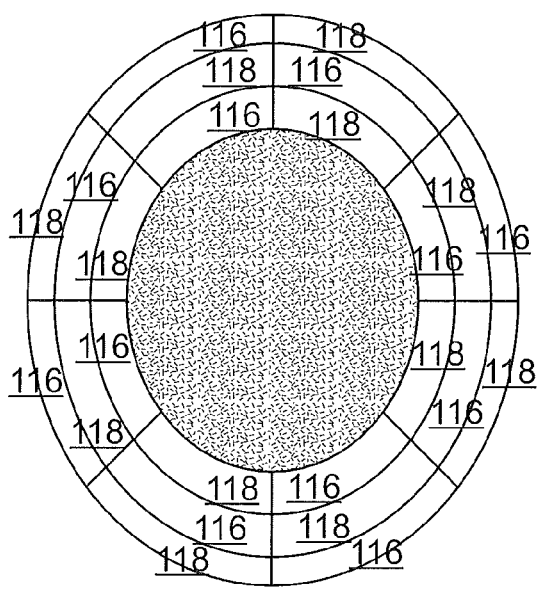
Figure 3C:
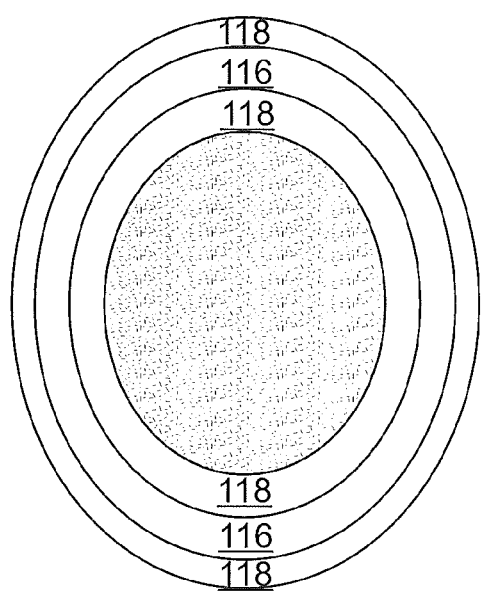
Figure 4A:
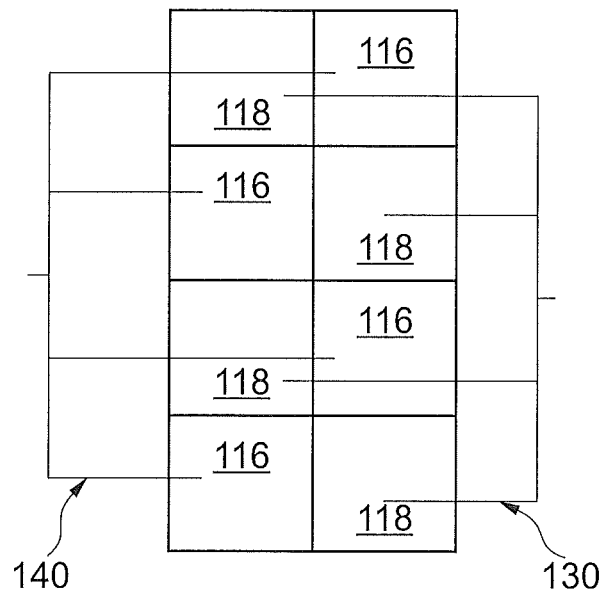
FIGS. 4A to 4C illustrate example cross-sectional views across B-B' of the intake arrangement of FIG. 2, in accordance with an exemplary embodiment of the present disclosure.
Figures 4B, 4C:
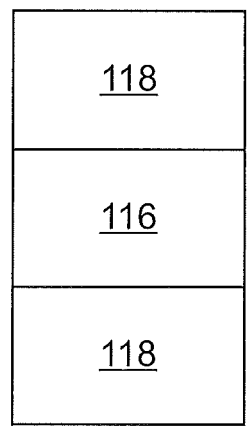

FIGS. 1 to 4C, illustrate various examples of an intake arrangement 100 and components thereof adapted to be configured in relation to a compressor 10 with a compressor inlet 12 of a gas turbine power plant 1000 (also referred to as "plant 1000"). FIGS. 1 and 2, respectively illustrate examples of the plant 1000 and a portion of the plant 1000 depicting the compressor 10 with the compressor inlet 12 along with the intake arrangement 100. Further, FIGS. 3A to 3C illustrate various examples of the intake arrangement 100 along a cross-section A-A' of FIG. 2. Furthermore, FIGS. 4A to 4C illustrate various examples of the intake arrangement 100 along a cross-section B-B' of FIG. 2.

In as much as the construction and arrangement of the intake arrangement 100, and the plant 1000 in which relation the intake arrangement 100 is adaptable and used, various associated elements may be well-known to those skilled in the art, it is not deemed necessary for purposes of acquiring an understanding of the present disclosure that there be recited herein all of the constructional details and explanation thereof. Rather, it is deemed sufficient to simply note that as shown in FIGS. 1 to 4C, in the intake arrangement 100, and the plant 1000 in which relation the intake arrangement 100 are adaptable, only those components are shown that are relevant for the description of various embodiments of the present disclosure.

Referring to FIG. 1, a diagrammatic illustration of the essential elements of the plant 1000 with flue gas recirculation is illustrated, in accordance with an exemplary embodiment of the present disclosure. The plant 1000 includes the compressor 10, which is adapted to receive combustion air from the compressor inlet 12. The fresh air is compressed in the compressor 10 for being delivered to a combustion chamber 14 and where fuel is burnt there with such compressed air. The hot combustion gases are subsequently expanded in a turbine 16.

The useful energy generated in the turbine 16 is then converted into electrical energy via generators. Hot flue gases emerging from the turbine 16 may be used, for optimal utilization of the energy still contained in them, in a waste Heat Recovery Steam Generator (HRSG) 20. Further, the flue gas stream from the waste HRSG 20 may be divided into two portions, wherein one portion of the flue gas stream 1 may be recirculated into the intake arrangement 100 for being mixed with the fresh air stream 2 there for being delivered to the compressor 10 via the compressor inlet 12. Before mixing the recirculated flue gas 2 with the air stream 1, it is essentially required to condition the flue gas in terms of cleaning and cooling at a cleaning and cooling section 23. Further, unreturned remaining portion of the flue gas stream may be discharged into the surroundings through a chimney 22 or may be used for other purpose.

In FIG. 2, an example of the intake arrangement 100 is illustrated, which may be utilized for mixing the fresh air with the recirculated flue gases to the compressor 10 via the compressor inlet 12. The intake arrangement 100 is shown to include at least a passageway, such as a passageway 110. The passageway 110 includes an elongated portion 112 and a circular portion 114. The elongated portion 112 includes distal end portions 112a, 112b. The circular portion 114 may be configured at the end portion 112a of the elongated portion 112. The passageway 110 is adapted to be configured to the compressor inlet 12 from the circular portion 114 side. The circular portion 114 is in proximity to the compressor 10 at around the compressor inlet 12.

The passageway 110 may be divided at least circumferentially and radially across the entire elongated portion 112 and at least partially across the circular portion 114 to configure a plurality of flue gas inlet segments 116 and a plurality of air inlet segments 118 (collectively may referred to as "segments 116"). The segments 116, 118 may be adapted to be partially configured across the circular portion 114 such that the segments 116, 118 in the circular portion 114 extend up to a portion 114a, leaving a portion 114b. In other words, the segments 116, 118 may be configured across the entire length of the elongated portion 112 from the one end portion 112a to other end portion 112b, and extends partially in the circular portion 114 up to the portion 114b only. However, without departing from the scope of the present disclosure, the segments 116, 118 may be configured across the entire portion of the circular portion 114 as per requirement.

In one most preferred embodiment of the present disclosure, the passageway 110 is divided to configure alternating adjacent segments of one air inlet segment 118 and one flue gas inlet segment 116 to each other. Various such alternating patterns of the segments 116, 118 are illustrated in example FIGS. 3A to 3C; and FIGS. 4A to 4C.

Specifically, FIGS. 3A to 3C illustrate various example cross-sectional views of the circular portion 114 along the portion 114a, across A-A' in the intake arrangement 100 of FIG. 2. In FIG. 3A, the portion 114a of the circular portion 114 is radially and circumferentially divided into eight segments, in which four segments thereof are adapted to supply a flue gas stream 1 therethrough, and signify the flue gas inlet segment 116. Further, the remaining four segments thereof are adapted to supply the fresh air stream 2 therethrough, and signify the air inlet segments 118. Furthermore, the eight such segments, four being the flue gas inlet segment 116 and the other four being the air inlet segments 118 are disposed such that each flue gas inlet segment 116 and each air inlet segments 118 alternates each other.

Similarly, in FIG. 3B, the portion 114a the circular portion 114 is radially and circumferentially divided into twenty four segments, in which twelve segments thereof are adapted to supply the flue gas stream 1 therethrough, and signify the flue gas inlet segment 116, and the remaining twelve segments thereof are adapted to supply the fresh air stream 2 therethrough, and signify the air inlet segments 118. The twenty four such segments, twelve being the flue gas inlet segment 116 and the other twelve being the air inlet segments 118 are disposed to each other in alternating fashion.

In further example, as shown in FIG. 3C, the portion 114a the circular portion 114 is only circumferentially divided into three segments, one being the flue gas inlet segments 116 and other two being the air inlet segments 118, each thereof being alternatingly configured. However, without departing from the scope of the present disclosure, various other numbers of segments may be configured, apart from what are depicted in FIGS. 3A to 3B, as per the requirement.

FIGS. 4A to 4C illustrate various example cross-sectional views of the elongated portion 112 across B-B' in the intake arrangement 100 of FIG. 2. In FIG. 4A, the elongated portion 112 is circumferentially divided into eight segments, in which four segments thereof are adapted to supply the flue gas stream 1 therethrough, and signify the flue gas inlet segment 116. Further, the remaining four segments thereof are adapted to supply the fresh air stream 2 therethrough, and signify the air inlet segments 118. Furthermore, the eight such segments, four being the flue gas inlet segment 116 and the other four being the air inlet segments 118, are disposed such that each flue gas inlet segment 116 and each air inlet segments 118 alternates each other.

Similarly, in FIG. 4B, the elongated portion 112 is circumferentially divided into twenty four segments, in which twelve segments thereof are adapted to supply the flue gas stream 1 therethrough, and signify the flue gas inlet segment 116, and the remaining twelve segments thereof are adapted to supply the fresh air stream 2 therethrough, and signify the air inlet segments 118. The twenty four such segments, twelve being the flue gas inlet segment 116 and the other twelve being the air inlet segments 118 are disposed to each other in alternating fashion.

In further example, as shown in FIG. 4C, the elongated portion 112 is circumferentially divided into three segments, one being the flue gas inlet segments 116 and other two being the air inlet segments 118, each thereof being alternatingly configured. However, without departing from the scope of the present disclosure, various other numbers of segments may be configured in various other shapes, apart from square shape as depicted in FIGS. 4A to 4B, as per the requirement.

Further, alternate arrangements, as depicted in FIGS. 3A to 4C, of the flue gas inlet segments 116 and the air inlet segments 118 enable expedited and proper mixing of the flue gas stream 1 and the fresh air stream 2 with each other. However, any other arrangement sequence of the flue gas inlet segments 116 and the air inlet segments 118, such as two flue gas inlet segments 116 alternatingly disposed to one air inlet segments 118, or two flue gas inlet segments 116 alternatingly disposed to two air inlet segments 118 etc., may also be possible and considered to be within the scope of the present disclosure.

Referring back to FIG. 2, each such flue gas inlet segments 116 is adapted to convey the flue gas stream 1 therethrough. For doing so, each of the flue gas inlet segments 116 at the end portion 112b of the elongated portion 112 may be adapted to be connected to a pipe 140 to receive the flue gas recirculated from the HRSG 20. Similarly, each of the air inlet segments 118 is adapted to convey the fresh air stream 2 therethrough. Each such inlet segment 118 at the end portion 112b of the elongated portion 112 may be adapted to be connected to a pipe 130 to receive the fresh air from atmosphere.

The flue gas stream 1 and the fresh air stream 2 from each such respective flue gas and air inlet segments 116, 118 converge at a region 'P' around and after the circular portion 114, to be blended into a target mass stream 3 for being conveyed into the compressor 10 through the compressor inlet 12. The region 'P' may be an area extending from the portion 114b of the circular portion 114 to up to the compressor inlet 12. The target mass stream 3 may be the properly blended mixture of the flue gas stream 1 and the fresh air stream 2, due to the alternating arrangement of the flue gas and air inlet segments 116, 118, as described above.

In one additional embodiment of the present disclosure, the intake arrangement 100 may include a converging nozzle 120 adapted to be disposed in coordination with the passageway 110. More specifically, the converging nozzle 120 is adapted to be disposed in coordination with the circular portion 114, more or less in the portion 114b thereof. The converging nozzle 120 may be disposed in a manner such that its converging face 120a faces toward the compressor inlet 12. The converging nozzle 120 may be adapted to further enhance the mixing of the flue gas stream 1 and the fresh air stream 2 to obtain properly blended target mass stream 3.

In further embodiment of the present disclosure, the intake arrangement 100 may include turbulator elements, which may be configured proximate to the circular portion 114 to enhance the turbulence there across to enhance the mixing of the flue gas stream 1 and the fresh air stream 2 to obtain the target mass stream 3.

The intake arrangement 100 of the present disclosure is advantageous in various scopes. The intake arrangement of the present disclosure enhances mixing of the recirculated flue gas and fresh ambient air in gas turbine power plants. Specifically, the alternating arrangements of the flue gas and air inlet segments enable expedited and proper mixing of the flue gas stream and the fresh air stream to obtain the target mass stream. Further, the intake arrangement is effective in mixing the recirculated flue gas and the fresh ambient air in the gas turbine power plants in an adaptable and economical manner. Segmented passageway as described herein above has no impedance on any of the components of the power plant rather it is advantageous in various respects as described above.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. An intake arrangement for a compressor in a gas turbine power plant, the intake arrangement, comprising:
   a passageway having an elongated portion, and a circular portion at an end portion of the elongated portion, the circular portion being arranged in proximity to the compressor at a compressor inlet;
   the passageway divided at least circumferentially and radially across the entire elongated portion and at least partially across the circular portion to configure,
   a plurality of flue gas inlet segments, each adapted to convey a flue gas stream therethrough; and
   a plurality of air inlet segments, each adapted to convey a fresh air stream therethrough,
   wherein the flue gas stream and the fresh air stream from each of the respective plurality of flue gas and air inlet segments, converge at a region (P) around and after the circular portion, to be blended into a target mass stream for being conveyed into the compressor through the compressor inlet.

2. The intake arrangement as claimed in claim 1, wherein the plurality of flue gas inlet segments and plurality of air inlet segments, are adapted to be partially configured across the circular portion such that the segments, in the circular portion extend up to a first portion, leaving a second portion.

3. The intake arrangement as claimed in claim 2 comprising:
   a converging nozzle adapted to be disposed in coordination with the circular portion, more or less in the portion, wherein the converging nozzle converges towards the compressor inlet.

4. The intake arrangement as claimed in claim 2, wherein the region (P) is an area extending from the second portion of the circular portion to up to the compressor inlet.

5. The intake arrangement as claimed in claim 1, wherein the passageway is divided to configure alternating adjacent segments of one air inlet segment and one flue gas inlet segment to each other.

6. The intake arrangement as claimed in claim 1, wherein each air inlet segment at an end portion of the elongated portion is adapted to be connected to a pipe to receive the fresh air.

7. The intake arrangement as claimed in claim 1, wherein each flue gas inlet segment at an end portion of the elongated portion is adapted to be connected to a pipe to receive the flue gas.

8. The intake arrangement as claimed in claim 1, comprising:
   turbulator elements configured proximate to the circular portion to enhance the turbulence there across.

9. The intake arrangement as claimed in claim 1, wherein the passageway is circumferentially divided into alternately arranged flue gas segments and air inlet segments.

10. The intake arrangement as claimed in claim 1, wherein the passageway is radially divided into alternately arranged flue gas segments and air inlet segments.

* * * * *